United States Patent [19]

Newman et al.

[11] 4,254,240
[45] Mar. 3, 1981

[54] CONTINUOUS PROCESS FOR THE PREPARATION OF BROMOCHLORINATED BUTYL RUBBER

[75] Inventors: Neil F. Newman, Edison; Robert Roper, Summit; Roger K. West, Montclair, all of N.J.

[73] Assignee: Exxon Research & Engineering Co., Florham Park, N.J.

[21] Appl. No.: 74,156

[22] Filed: Sep. 10, 1979

[51] Int. Cl.$^3$ .............................. C08F 8/20; C08F 8/22
[52] U.S. Cl. .................................. 525/356; 525/355; 525/357; 525/358
[58] Field of Search ................. 525/356, 357, 358, 355

[56] References Cited

U.S. PATENT DOCUMENTS

| | | |
|---|---|---|
| 2,962,482 | 11/1960 | Cottle et al. .......................... 525/356 |
| 2,965,620 | 12/1960 | Serniuk et al. ....................... 525/356 |
| 3,009,904 | 11/1961 | Serniuk et al. ....................... 525/356 |
| 3,009,906 | 11/1961 | Eichhorn et al. ..................... 525/356 |
| 3,966,692 | 6/1976 | Driscoll et al. ...................... 525/356 |
| 4,130,519 | 12/1978 | Roper et al. ..................... 260/23.7 H |

FOREIGN PATENT DOCUMENTS

| | | | |
|---|---|---|---|
| 929614 | 6/1963 | United Kingdom ..................... | 525/356 |
| 1483063 | 8/1977 | United Kingdom . | |
| 1483064 | 8/1977 | United Kingdom . | |

*Primary Examiner*—William F. Hamrock
*Attorney, Agent, or Firm*—Harvey L. Cohen

[57] ABSTRACT

A solution of butyl rubber in an inert solution such as n-hexane is halogenated in a continuous process using bromine chloride vapor and high intensity mixing means for both the halogenation and subsequent neutralization steps. Adjustment of the mole ratio of bromine chloride to isoprene, where an isobutylene-isoprene butyl copolymer is used, to less than about 1.5 to 1 prevents overhalogenation and significant molecular weight loss, while the use of bromine chloride vapor results in improved process safety.

The doubly halogenated product, containing both bromine and chlorine in its structure can be vulcanized in the absence of sulfur, e.g., with zinc oxide. It is particularly useful in rubber compositions where the singly halogenated product is employed, but demonstrates product performance advantages compared to both brominated butyl rubber and chlorinated butyl rubber.

8 Claims, No Drawings

CONTINUOUS PROCESS FOR THE PREPARATION OF BROMOCHLORINATED BUTYL RUBBER

BACKGROUND OF THE INVENTION

1. Field of the Invention

This invention relates to the production of halogenated butyl rubber and more particularly to a halogenated butyl rubber containing combined bromine and chlorine in the polymer molecule. More particularly, the present invention relates to a novel, continuous and efficient process for reacting isobutylene-isoprene butyl rubber with gaseous bromine chloride to form a bromochlorinated product.

Chlorinated butyl rubber and brominated butyl rubber are each well known in the art, as well as the butyl rubber from which they are derived. Prior art techniques for producing halogenated butyl rubber containing both bromine and chlorine were inefficient processes which required either sequential halogenation with one halogen at a time or the use of laminar flow conditions and liquid bromine chloride, which is undesirable compared to the use of bromine chloride vapor.

2. Prior Art

Halogenated butyl rubber, as represented by chlorinated butyl rubber and brominated butyl rubber are well known in the art and are commercially available products. Numerous patents related to these products are available, but only those dealing with butyl rubber containing both chlorine and bromine prepared by the use of bromine chloride are relevant to the instant application. Additional references are available which either incidentally disclose bromine chloride in a list of potential halogenating agents for butyl rubber, see e.g., U.S. Pat. No. 3,018,275 to D. L. Cottle, at col. 2, line 45, or teach methods for preparing a halogenated butyl containing both chlorine and bromine by starting with, e.g., a chlorinated butyl rubber and brominating it, or e.g., vice versa, e.g., see U.S. Pat. No. 3,009,904 to G. E. Serniuk, et al, especially col. 2, lines 15-22. The latter reference also suggests, at col. 2, lines 5-11, that mixed halogens can be introduced into butyl rubber by reacting it with a mixture of bromine and chlorine. However, no process is disclosed for accomplishing this purpose and no direction is given to utilize bromine chloride in the vapor form as the preferred reagent. Additionally, the several techniques for producing a polymer containing both bromine and chlorine are suggested as equivalent, alternative methods for providing the same product. Clearly, there was no recognition of the unique product achievable by the process disclosed herein.

The reaction of bromine chloride with butyl rubber is described in U.S. Pat. No. 3,966,692, issued June 29, 1976 to R. F. Driscoll, et al, e.g., Example II therein discloses the reaction of bromine monochloride with butyl rubber in a hexane solution. However, this reference specifically requires laminar flow of the reacting streams (e.g. col. 1, lines 50-51) and the preferred use of liquid bromine chloride (e.g., col. 2, the paragraph starting at line 26) and, as an essential feature, maintenance of positive pressure on the reacting system to prevent volatilization of the organic solvent, halogen or halogen halide (col. 3, lines 21-30).

The use of bromine chloride to halogenate polybutadiene or butadiene-isoprene copolymers is disclosed in British Pat. No. 1,483,063 and the similar halogenation of polyisoprene is disclosed in British Pat. No. 1,483,064. Both patents are limited to the specific polymers cited with no indication that halogenation would be successful with other polymers, especially one of substantially lower unsaturation, e.g., butyl rubber. In addition, both patents are directed to producing polymers containing at least 55% halogen with at least one chlorine atom and at least one bromine atom for each two monomer units in the British Pat. No. 1,483,063 patent and two chlorine atoms and at least one bromine atom for each two monomer units in the British Pat. No. 1,483,064 patent. The bromine to chlorine molar ratios differ markedly from those achieved in the instant invention. Process features to achieve the desired product also differ substantially, see e.g., the British Pat. No. 1,483,064 patent at lines 85-87 wherein a preferred molar ratio of bromine chloride to polyisoprene of 6:1 is disclosed.

The preparation of bromochlorinated butyl rubber was referred to in U.S. Pat. No. 4,130,519 to Roper, et al (col. 4, starting at line 10), issued Dec. 19, 1978. That general disclosure is based on the invention disclosed herein, the assignee of the entire interest in both cases being the same and two of the inventors in each case also being the same.

SUMMARY OF THE INVENTION

In accordance with the present invention, it has been discovered that butyl rubber containing both bromine and chlorine can be efficiently prepared in a continuous process comprising the steps of (a) providing in a first feed stream a solution of butyl rubber in a substantially inert solvent, said solution containing about 5 to about 30 weight percent of butyl rubber;

(b) providing a second feed stream of bromine chloride in a vapor form;

(c) maintaining the relative flow rates of said first and second feed streams such that the ratio of moles of bromine chloride to moles of incorporated unsaturation is said butyl rubber is about 0.6 to 1 to about 1.5 to 1 while continuously transferring said first and second feed streams to a high intensity mixer and contacting said streams in said mixer to provide a homogeneous reaction mixture;

(d) transferring said reaction mixture from step (c) to a second high intensity mixer, the mean transfer residence time being at least about 1 minute in order to complete the bromochlorination reaction;

(e) simultaneously adding to said second mixer an aqueous solution of a basic neutralization feed stream resulting in a two phase, partially neutralized reaction mixture;

(f) transferring said two phase reaction mixture to polymer recovery and drying means, the residence time of said transfer being at least about 1 minute in order to complete the neutralization reaction, the pH of said mixture maintained between about 7 and 13.

As a result of utilizing bromine chloride in the vapor form, the preferred process operates with greater safety, e.g., less chance of a fire, than one in which liquid bromine chloride were to contact the butyl rubber solution. The halogenated polymer obtained using the preferred process is characterized by unique compositional features: from about 1.0 to about 3.0 weight percent bromine and from about 0.05 to about 0.5 weight percent chlorine. In the preferred polymer, the mole ratio of bromine to chlorine is about 4 to 1. This polymer can be vulcanized with sulfur-free cure systems, e.g., zinc oxide alone, and is also useful in rubber compounds comprising blends with high unsaturation rubbers, for example, natural rubber and/or styrene butadiene rubber, useful in various tire compounds, for example, innerliners and sidewalls.

DETAILED DESCRIPTION

(A) Butyl Rubber

The expression "butyl rubber" is used in the rubber industry to describe copolymers made from a polymerization reaction mixture having therein from 70 to 99.5% by weight of an isoolefin which has about 4 to 8 carbon atoms, e.g., isobutylene, and about 30 to 0.5% by weight of a conjugated multiolefin having from about 4 to 14 carbon atoms, e.g., isoprene. The resulting copolymers contain 85 to 99.5% by weight of combined isoolefin and about 0.5 to 15% by weight of combined multiolefin. The preparation of butyl rubber is described in U.S. Pat. No. 2,356,128, which is incorporated herein by reference. The polymer backbone of commerical butyl rubber consists primarily of isobutylene units, with a few percent of isoprene units.

Conventional high molecular weight butyl rubber generally has a number average molecular weight of about 25,000 to about 500,000, preferably about 80,000 to about 300,000, especially about 100,000 to about 250,000; and a Wijs Iodine No. of about 0.5 to 50, preferably 1 to 20. More recently low molecular weight polymers have also been prepared which have number average molecular weights of from 5,000 to 25,000 and unsaturation expressed as mole %, of 2-10.

(B) CONVENTIONAL HALOGENATED BUTYL RUBBER

Some forms of halogenated butyl rubber are commercially available, such as chlorinated butyl rubber and brominated butyl rubber. One method used to prepare halogenated butyl rubber is that of halogenating butyl rubber in a solution (butyl rubber cement) containing between 1 to 60% by weight of butyl rubber in a substantially inert $C_5$–$C_8$ hydrocarbon solvent such as pentane, hexane, heptane, etc. and contacting this butyl rubber cement with a halogen for a period of up to about 25 minutes. There is then formed the halogenated butyl rubber and a hydrogen halide, the polymer containing up to one or somewhat more halogen atoms per double bond initially present in the polymer. Generally, halogenated butyl rubber comprises a copolymer of 85 to 99.5 weight percent of a $C_4$ to $C_8$ isoolefin, e.g., isobutylene, with 15 to 0.5 weight percent of a $C_4$ to $C_{14}$ multiolefin, e.g., isoprene, containing at least about 0.5 weight percent combined halogen in its structure. For example, where butyl is halogenated with bromine, the bromine can be present in the brominated butyl in an amount of from about 1.0 to about 3.0 weight percent, preferably from about 1.5 to about 2.5 weight percent. A method of preparing conventionally halogenated butyl rubber is described in U.S. Pat. No. 3,099,644, which is incorporated herein by reference.

(C) BROMOCHLORINATED BUTYL RUBBER PROCESS

Halogenated butyl rubber containing both bromine and chlorine, i.e., bromochlorinated butyl rubber, of this invention is prepared as follows:

(a) a solution of butyl rubber (butyl cement) in a substantially inert solvent is provided as a first feed stream. Suitable solvents include carbon tetrachloride, chloroform, nonolefinic hydrocarbons having three to twelve carbon atoms, preferably four to eight carbon atoms, such as cyclohexane, cyclopentane, butane, isobutane, n-pentane, isopentane, neopentane, n-hexane, isohexane, 3-methylpentane, neohexane, n-heptane or aromatic hydrocarbons such as benzene or toluene, or mixtures of these. The preferred solvent is n-hexane.

(b) A second feed stream comprises bromine chloride in vapor form. The Bromine chloride vapor is conveniently formed by delivering liquid bromine chloride from a storage tank to a vaporizer, using nitrogen, for example, to pressurize the feed, wherein sufficient heat is applied to completely vaporize it and elevate the vapor pressure to a level at which it will not condense prior to contacting the butyl cement. For the purposes of this invention bromine chloride liquid and vapor are not considered equivalent materials. Bromine chloride vapor is the preferred reactant compared to the liquid because there is experimental evidence to indicate a potential fire hazard using, for example, liquid bromine chloride and hexane in the presence of air.

The relative flow rate of butyl cement and bromine chloride vapor feed streams are adjusted so that the ratio of moles of bromine chloride to moles of incorporated unsaturation in the butyl, e.g., isoprene, is about 0.6 to 1 to about 1.5 to 1, preferably 0.8 to 1 to about 1.3 to 1, most preferably 0.9 to 1 to about 1.1 to 1. Higher ratios tend to waste halogen and result in excessive molecular weight breakdown of the bromochlorobutyl product.

(c) Said first and second feed streams are brought together in a first high intensity mixer. The specific type of mixer to be used is not critical to the invention, so that commercially available equipment which provides high intensity mixing of the cement and bromine chloride vapor is suitable, e.g., a Stratco contactor (manufactured by the Stratford Engineering Corp. of Kansas City, Mo.) and the dispersator mixer (manufactured by Premier Mills of Geneva, N.Y.). High intensity mixing rapidly homogenizes the butyl cement and bromine chloride and thereby eliminates the possibility of localized overhalogenation of the butyl due to inadequate mixing.

The concentration of butyl rubber in the solvent, e.g., hexane, is from about 5 to about 30 weight percent, preferably from about 10 to about 25 weight percent. The temperature and pressure of this feed stream are not critical to this invention. The pressure should be maintained at a level sufficient to drive material through the process equipment at a satisfactory flow rate, preferably greater than atmospheric pressure to about 100 psig, for example about 50 psig. The temperature of the butyl cement is from about 0° C. to less than its boiling point at the operating pressure, for example greater than 30° C.

(d) The reaction mixture is then transferred from said first high intensity mixer to a second high intensity mixer. However, the transfer line volume is controlled so as to provide a mean transfer residence time of at least about 1 minute in order to complete the bromochlorination reaction. Alternatively, the reaction mixture from the first high intensity mixture is transferred to a time-tank reactor wherein the mean residence time is from at least about 1 to about 30 minutes, preferably from about 3 to about 12 minutes.

(e) In order to neutralize the hydrogen halides formed as by-products of the bromochlorination reaction, a neutralization feed stream is fed to the second high intensity mixer. Suitable feed streams include dilute aqueous solutions of the hydroxide or carbonate of an alkali metal or ammonium hydroxide. Suitable solutions include those of sodium hydroxide, calcium hydroxide and potassium hydroxide, preferably sodium hydroxide. The flow rate of the neutralization stream is adjusted so that the pH of the aqueous phase following completion of the neutralization reaction is from about 7 to to about 13, preferably from about 9 to about 12. Contact of the streams in a second high intensity mixer maximizes interaction of the organic and aqueous phases which assists in rapid neutralization of the by-product hydrogen halides thereby minimizing corrosion of subsequent process equipment.

(f) The two phase reaction mixture exiting the second high intensity mixer is then transferred to polymer recovery and drying means, the residence time of said transfer being at least about 1 minute in order to complete the neutralization reaction. Alternatively, said two phase reaction mixture is transferred to a stirred reaction vessel in which neutralization is completed, the residence time in said vessel being between about 1 minute to about 100 minutes.

Thermal stabilization of the bromochlorinated butyl during further processing and, in particular, drying operations, can be achieved by addition of an effective amount of stabilizer added to the neutralized, two phase reaction mixture. This invention is not limited by the method of stabilization selected, but one such method of stabilization of halogenated butyl rubber and bromochlorinated butyl rubber in particular is disclosed in U.S. Pat. No. 4,130,519 to Roper, et al, incorporated herein by reference. Said stabilizer comprises (a) an alkali metal carboxylate or an alkaline earth metal carboxylate, (b) an ether (as disclosed and defined in U.S. Pat. No. 4,130,519) and (c) an oxide or hydroxide of a metal selected from the group consisting of magnesium, calcium, strontium and barium.

Following neutralization and stabilization as previously described, the bromochlorinated butyl reaction mixture is passed to storage or to other units suitable for recovery and drying the solid polymer. This recovery system may be any type known to the art. For example, the polymer may be precipitated with acetone or any other known non-solvent for the polymer and dried under about 1 to 760 millimeters or higher of mercury pressure absolute at a temperature between 0° and 180° C., preferably between 50° and 150° C. A suitable temperature is 70° C. Other methods of recovering the bromochlorinated butyl polymer from the two phase mixture are conventional spray or drum drying techniques. A particularly effective method of recovery is to discharge said mixture through a nozzle with steam and/or water into a vessel containing agitated water heated to a temperature sufficient to flash off the hydrocarbon solvent and form an aqueous slurry of the bromochlorinated butyl rubber. The rubber may then be separated by filtration, dried and recovered as a "crumb" or as a dense sheet or slab by conventional milling and/or extruding procedures.

(D) BROMOCHLORINATED BUTYL RUBBER PRODUCT

The bromochlorinated butyl rubber product prepared according to the process disclosed herein is characterized in that the bromine and chlorine are distributed in a specific manner in the halogenated polymer: from about 1.0 to about 3.0 weight % bromine and from about 0.05 to about 0.5 weight % of chlorine. The mole ratio of bromine: chlorine of about 4:1 is markedly deviant from the 1:1 ratio expected for an addition reaction and the utilization of approximately 50 mole % of the BrCl, in combination with a strongly acidic reaction medium is consistent with a primarily substitutive reaction.

The molecular weight of the bromochlorinated polymer is a function of the molecular weight of the butyl rubber prior to halogenation. In the preferred process only a minor amount of molecular weight breakdown will occur; generally up to about 15%, typically 5–15%, for example 10% loss in Mooney viscosity.

The bromochlorinated butyl rubber product of the process disclosed herein has particularly advantageous properties relative to butyl which is only chlorinated or brominated. Relative to bromobutyl, bromochlorobutyl rubber has improved thermal stability in the gum or uncompounded state; it has better color stability, dehydrohalogenates more slowly and can be adequately stabilized with less stabilizer. As the data in the following table show, bromochlorinated butyl is both lighter and less yellow than brominated butyl at two test temperatures.

| Heat Aged 10 min.@ | Thermal Stability as Measured by Munsell Color Ratings[1] | |
|---|---|---|
| | Bromochlorinated Butyl | Brominated Butyl |
| 155° C. | | |
| Lightness | 8.4 | 7.7 |
| Yellowness | 2.1 | 3.9 |
| 177° C. | | |
| Lightness | 7.3 | 5.9 |
| Yellowness | 3.4 | 4.9 |

[1]Lightness is measured on the 0–10 Gray Scale, where 10 is best; yellowness on the chroma scale of 0–14 where 0 is best.

The differences are readily observable at both temperatures, and quite pronounced at 177° C.

The lower stabilizer requirement of the bromochlorinated elastomer was evident when, in a direct comparison, a 60% reduction in stabilizer concentration caused substantial loss of color stability in the brominated butyl sample but very little effect on the bromochlorinated butyl. In fact, the bromochlorinated butyl at the lower stabilizer level was at least as good as the brominated butyl at the higher level.

Evidence of slower dehydrohalogenation for the bromochlorinated elastomer was provided by measurement of stearic acid following heat aging of samples containing calcium stearate as part of the stabilizer system. Dehydrohalogenation, with its concomitant formation of acid, results in stearic acid formation on reaction with calcium stearate. For example, whereas a bromochlorinated sample had a slightly lower stearic acid content than the brominated butyl sample prior to heat aging (0.25% v. 0.45%), it had a distinctly lower level after aging at 155° C. (0.77% v. 1.21%). The lower initial content is also indicative of improved thermal stability during recovery of the elastomer following halogenation. In addition, said bromochlorinated butyl rubber product displays a significantly better "shelf" life following compounding with the various curatives and accelerators normally used in the rubber compounding art. This property manifests itself as greater increases in Mooney viscosity after storing and remilling for brominated butyl rubber compared to the bromochlorinated elastomer disclosed herein. As a result of the advantageous process disclosed herein, said bromochlorinated butyl rubber is also less expensive to manufacture.

Relative to chlorinated butyl rubber, said bromochlorinated butyl rubber product demonstrates improved adhesion to compounds containing natural rubber or blends of natural rubber with styrene butadiene rubber or butadiene rubber in laboratory tests. Rubber-to-rubber adhesion is typically measured by a strip adhesion test similar to ASTM D-2630. In this test, a four layer composite consisting of a rubber compound substrate and the test composition is vulcanized with support backings of rubber-coated tire cord placed on each outside surface of the test specimen. The rubber compounds are separated at one end by a strip of non-adhesive plastic film in order to provide a free end at which each half of the composite may be grasped for testing in a tensile test apparatus.

The bromochlorinated butyl rubber of this invention can be processed in standard rubber equipment such as internal mixers, mills, extruders, calenders, etc. at the normally elevated temperatures of use for such equipment. Said rubber is amenable to conventional rubber compounding practice and various fillers and extenders can be incorporated in said rubber, e.g., various carbon blacks, clays, silicas, carbonates, oils, resins, waxes, etc.

The stabilized halogenated butyl rubber of this invention may be cured by any of the prior art methods suitable for such halogenated butyl rubbers, e.g., using sulfur, sulfur-containing curing agents (such as sulfenamide derivatives, benzothiazyl disulfide, tetramethylthiuram disulfide, alkyl phenol disulfide, etc.), zinc oxide alone or with various promoters, and mixtures thereof. Curing is usually accomplished at a temperature of from about 140° C. to about 250° C., preferably 150° C. to about 200° C., and usually takes from 1 to 150 minutes.

This invention will be further understood by reference to the following example which describes a laboratory experiment demonstrating the principles of this invention.

EXAMPLE 1

A 12-liter round bottom flask with bottom draw was fitted with a dry-ice condenser, thermometer, mechanical stirrer and a gas sparger tube with fritted end. The interior of the flask was darkened by an electric heating mantle on the lower half and aluminum foil on the upper half.

The gas sparger tube was connected to a bromine chloride vaporizer consisting of a 100 ml round bottom flask heated to approximately 200° C. and mounted under a jacketed dropping funnel. The connecting line to the sparger was traced with electrical tape and maintained at approximately 100° C. The jacket of the dropping funnel was filled with an ice-water mixture.

The 12-liter flask was charged with sufficient butyl cement to contain approximately 850 g of isobutylene-isoprene butyl rubber (see table 1). As required, additional n-hexane is also charged to the flask to reduce the viscosity to a level commensurate with adequate stirring. The contents of the 12-liter flask were stirred and heated to 50° C.

The desired amount of liquid bromine chloride was measured volumetrically and poured into the jacketed dropping funnel which was then sealed at the top. It was dropped during approximately 30 seconds into the hot 100 ml flask in which it was vaporized during approximately 3 minutes, the vapor passing through the heated connecting arm and gas sparger into the stirred cement.

After vaporization was complete the top seal of the dropping funnel was replaced by a nitrogen line and nitrogen ($N_2$) pulsed briefly through the vaporizer system to assure that residual bromine chloride vapors were charged into the 12-liter flask. The contents of the 12-liter flask were stirred at 50° C. for 5 minutes after completing the $N_2$-pulsation (approximately 9 minutes after commencing bromine chloride vaporization).

Two liters of 0.20 M sodium hydroxide was poured into the 12-liter flask, heating was discontinued, and the mixture was stirred for 1 hour. The aqueous layer was removed and the organic layer washed four times (15 minutes each) with 1 liter portions of water. After removing the final aqueous layer, 10% calcium stearate slurry was added to the cement which was then steam stripped to isolate solid polymer.

The polymer was dried on a two roll laboratory mill at 130° C. and weighed. The appropriate amount of the ether component of the stabilizer was calculated (in these experiments polyethers sold under the trademarks Arlatone T and Drapex 6.8 were utilized) and then added to the polymer on the 130° C. mill. A summary of the experimental runs appears in Table 1 and properties of the bromochlorinated butyl rubber obtained in Table 2.

TABLE 1

| Run | Cement (Butyl) g | Additional n-hexane ml | Bromine Chloride g | Calcium Stearate g | Polyether g |
|---|---|---|---|---|---|
| 1 | 3700 (860) | 2500 | 31.6 | 13.3 | 3.87[a] |
| 2 | 3600 (850) | 2500 | 31.2 | 13.2 | 6.72[b] |
| 3 | 6298 (862) | — | 31.7 | 13.3 | 3.83[a] |
| 4 | 6094 (834) | — | 30.7 | 12.9 | 6.69[b] |
| 5 | 6175 (845) | — | 37.2 | 13.1 | 3.80[a] |

[a]Arlatone T; amount corresponds to 0.45 wt. % based on recovered polymer.
[b]Drapex 6.8; amount corresponds to 0.80 wt. % based on recovered polymer.

TABLE 2

| | Run Results/Polymer Properties | | | | | |
|---|---|---|---|---|---|---|
| | Halogen Content (Weight %) | | Utilization[a] (%) | | Molecular Weight[b] | Mooney |
| Run | Br | Cl | Br | Cl | ($\times 10^{-3}$) | Viscosity[c] |
| 1 | 1.79 | 0.18 | 73 | 17 | 415 | 42 |
| 2 | 1.79 | 0.19 | 73 | 18 | 411 | 40 |
| 3 | 1.67 | 0.20 | 68 | 18 | 449 | 60 |
| 4 | 1.73 | 0.20 | 71 | 18 | 453 | 62 |
| 5 | 1.84 | 0.20 | 63 | 15 | 453 | 58 |

[a]Defined as a weight percentage: halogen incorporated in the polymer divided by halogen fed.
[b]Viscosity average molecular weight.
[c]ASTM D-1646 D-1646, 127° C., large rotor, 1 minute preheat, 3 minute reading.

These results demonstrate that a high molecular weight bromochlorinated butyl rubber is produced said rubber containing both bromine and chlorine wherein bromine is present in greater concentration than chlorine.

Vulcanization characteristics of the bromochlorinated butyl rubber polymers were measured after compounding the above polymers with 50 parts per hundred of rubber (phr) of SRF carbon black, 5 phr zinc oxide and 1 phr stearic acid. The test method employed was ASTM D 2084, "Measurement of Curing Characteristics With the Oscillating Disk Cure Meter." Conditions used were: 150° C., 5° Arc, 60 minute motor.

TABLE 3

| | Vulcanization Properties | | |
|---|---|---|---|
| Run | Max Torque Change$^a$ (lb.-in.) | Scorch Time$^b$ (minutes) | Time to 90% Cure$^c$ (minutes) |
| 1 | 23.2 | 5.5 | 10.8 |
| 2 | 26.7 | 5.0 | 9.5 |
| 3 | 28.8 | 7.8 | 13.5 |
| 4 | 31.8 | 7.8 | 13.5 |
| 5 | 33.8 | 6.6 | 11.0 |

$^a$Torque at 60 minutes minus minimum torque
$^b$Time from start for a rise of 5 lb.-in. above minimum
$^c$Time from start to reach 90% of the maximum torque level.

These results demonstrate that the bromochlorinated butyl rubber produced by the process disclosed herein can be vulcanized with a simple zinc oxide/stearic acid cure system, consistent with the generally accepted understanding of the response of halogenated butyl containing only bromine or chlorine.

What is claimed is:

1. A continuous process for bromochlorinating butyl rubber to contain from about 1.0 to about 3.0 weight % bromine and from about 0.05 to about 0.5 weight % of chlorine comprising the steps of:
   (a) providing in a first feed stream a solution of butyl rubber in a substantially inert solvent, said solution containing about 5 to about 30 weight percent of butyl rubber;
   (b) providing a second feed stream of bromine chloride in vapor form;
   (c) maintaining the relative flow rates of said first and second feed streams such that the ratio of moles of bromine chloride to moles of incorporated unsaturation in said butyl rubber is about 0.6 to 1 to about 1.5 to 1 while continuously transferring said first and second feed streams to a high intensity mixer and contacting said streams in said mixer to provide a homogeneous reaction mixture;
   (d) transferring said reaction mixture from step (c) to a second high intensity mixer, the mean transfer residence time being at least about 1 minute in order to complete the bromochlorination reaction;
   (e) simultaneously adding to said second mixer an aqueous solution of a basic neutralization feed stream resulting in a two phase, partially neutralized reaction mixture;
   (f) transferring said two phase reaction mixture to polymer recovery and drying means, the residence time of said transfer being at least about 1 minute in order to complete the neutralization reaction, the pH of said mixture maintained between about 7 and 13.

2. The process of claim 1 wherein said butyl rubber is an isobutylene-isoprene copolymer.

3. The process of claim 2 wherein the solvent in said butyl rubber solution is hexane.

4. The process of claim 1 wherein said bromine chloride vapor is fed from a vaporizer to which liquid bromine chloride is fed and sufficient heat is applied to vaporize said bromine chloride.

5. The process of claim 1 further comprising the steps of transferring said reaction mixture from said first high intensity mixer to a holding vessel in order to complete said bromochlorination reaction, the mean residence time in said holding vessel being about 1 to about 30 minutes.

6. The process of claim 1 further comprising the step of transferring said two phase, partially neutralized reaction mixture from said second high intensity mixer to a stirred vessel to complete the neutralization of said mixture the residence time in said stirred vessel being between about 1 to about 100 minutes.

7. The process of claim 1 wherein the neutralization feed stream comprises an aqueous solution of sodium hydroxide.

8. The process of claim 3 further comprising the step of transferring said reaction mixture from said first high intensity mixer to a holding vessel in order to complete said bromochlorination reaction, the mean residence time in said holding vessel being about 1 to about 30 minutes, and further comprising the step of transferring said two phase partially neutralized reaction mixture from said second high intensity mixer to a stirred vessel to complete the neutralization of said mixture, the residence time in said stirred vessel being between about 1 to about 100 minutes, wherein said neutralization feed stream comprises an aqueous solution of sodium hydroxide.

* * * * *